(12) United States Patent
Kubota et al.

(10) Patent No.: US 9,529,178 B2
(45) Date of Patent: *****Dec. 27, 2016

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,184

(22) Filed: Apr. 15, 2015

(65) Prior Publication Data

US 2015/0226940 A1  Aug. 13, 2015

Related U.S. Application Data

(63) Continuation of application No. 14/050,695, filed on Oct. 10, 2013, now Pat. No. 9,036,277.

(30) Foreign Application Priority Data

Oct. 29, 2012  (JP) .................................. 2012-237727

(51) Int. Cl.
*G02B 9/60* (2006.01)
*G02B 13/04* (2006.01)
*G02B 3/02* (2006.01)
*G02B 13/00* (2006.01)
*G02B 3/04* (2006.01)
*G02B 13/06* (2006.01)
*G02B 27/00* (2006.01)

(52) U.S. Cl.
CPC ............ *G02B 13/0045* (2013.01); *G02B 3/04* (2013.01); *G02B 9/60* (2013.01); *G02B 13/04* (2013.01); *G02B 13/06* (2013.01); *G02B 27/0025* (2013.01)

(58) Field of Classification Search
CPC ............... G02B 9/00; G02B 9/60; G02B 9/64; G02B 13/04; G02B 13/0045
USPC ................ 359/708, 713, 714, 746, 749–757, 359/761–763, 770
See application file for complete search history.

(56) References Cited

U.S. PATENT DOCUMENTS

| 7,486,449 B2* | 2/2009 | Miyano | G02B 23/243 359/770 |
| 2009/0052061 A1* | 2/2009 | Asami | G02B 13/04 359/783 |
| 2010/0142062 A1* | 6/2010 | Asami | G02B 13/04 359/793 |
| 2011/0102541 A1 | 5/2011 | Jin et al. | |
| 2012/0069140 A1* | 3/2012 | Tsai | G02B 13/0045 348/36 |

(Continued)

FOREIGN PATENT DOCUMENTS

JP    2011-107593 A    6/2011

*Primary Examiner* — Darryl J Collins
(74) *Attorney, Agent, or Firm* — Kubotera & Associates, LLC

(57) ABSTRACT

An imaging lens includes a first lens having negative refractive power; a second lens; a third lens; a fourth lens having positive refractive power; and a fifth lens. The second lens has a surface on the object side formed in an aspheric shape. The first to fifth lenses are formed of materials having specific Abbe's numbers to satisfy specific conditions.

18 Claims, 15 Drawing Sheets

(56) References Cited

U.S. PATENT DOCUMENTS

2012/0268835 A1\* 10/2012 Huang ................ G02B 13/006
                                                        359/717
2013/0308206 A1\* 11/2013 Hsu .................... G02B 13/0045
                                                        359/714

\* cited by examiner

IMAGING LENS

CROSS-REFERENCE TO RELATED APPLICATIONS

This is a continuation application of a prior application Ser. No. 14/050,695, filed on Dec. 10, 2013, allowed, which claims priority of Japanese Patent Application No. 2012-237727, filed on Oct. 29, 2012.

BACKGROUND OF THE INVENTION AND RELATED ART STATEMENT

The present invention relates to an imaging lens for forming an image of an object on an imaging element such as a CCD sensor and a CMOS sensor, and particularly, it relates to an imaging lens suitable for mounting in a relatively small camera such as a cellular phone, a digital still camera, a portable information terminal, a security camera, a vehicle onboard camera, and a network camera.

In these years, in order to enhance convenience and improve security, a plurality of cameras is mounted on a vehicle. For example, in case of a vehicle equipped with a rear-view camera to take an image behind the vehicle, the view behind the vehicle is shown on a monitor when a driver drives the vehicle backward. Accordingly, the driver can safely drive the vehicle backward without contacting obstacles that cannot be directly seen by the driver. Such cameras for mounting on vehicles, i.e., so-called onboard cameras, are expected to increase in popularity.

Generally speaking, an onboard camera is often accommodated in a relatively small space such as in a back door, a front grille, a side mirror, and inside of the vehicle. For this reason, in addition to a small size, an imaging lens for mounting on the onboard camera is required to be suitable for a high resolution accompanied by an increased number of pixels of an imaging element and a wider angle to take in a broad range. However, it is difficult to achieve a small size and a high resolution as well as a wide imaging angle, while properly correcting aberrations. For example, when a size of an imaging lens is reduced, refractive power of individual lens tends to become stronger. Accordingly, it is difficult to satisfactorily correct aberrations. Therefore, upon actually designing an imaging lens, it is important to meet those requirements in a well-balanced manner.

As an imaging lens with a wide imaging angle, for example, Patent Reference has disclosed a conventional imaging lens. The conventional imaging lens includes a negative first lens that has a shape of a meniscus lens directing a convex surface thereof to the object side, a second lens having a biconcave shape, a third lens having a biconvex shape, an aperture stop, a fourth lens having a biconvex shape, and a negative fifth lens that has a shape of a meniscus lens directing a concave surface thereof to the object side, arranged in this order from an object side.

According to the conventional imaging lens disclosed in Patent Reference, the third lens and the fifth lens in the configuration are formed of a high-dispersion material. Accordingly, it is possible to correct a field curvature and a chromatic aberration of magnification. Further, the second lens is formed in a shape of a biconcave lens near an optical axis thereof to achieve a wide angle, thereby increasing negative refractive power.

Patent Reference: Japanese Patent Application Publication No. 2011-107593

According to the conventional imaging lens described in Patent Reference, although the number of lenses that compose the imaging lens is as few as five, an imaging angle of view is wide and it is possible to relatively satisfactorily correct aberrations. In the conventional imaging lens, however, a total length of the whole lens system tends to become long relative to a focal length. Accordingly, it is difficult to achieve a small size. In these days, there remain issues to achieve both downsizing of the imaging lens and satisfactory correcting aberration. Here, such an issue is not a problem specific to the imaging lens for mounting on onboard cameras. Rather, it is a common problem for an imaging lens to accommodate in a relatively small camera such as cellular phones, digital still cameras, portable information terminals, security cameras, and network cameras.

In view of the above-described problems in conventional techniques, an object of the present invention is to provide an imaging lens that has wide imaging angle of view and can satisfactorily correct aberrations in spite of a small size thereof.

Further objects and advantages of the present invention will be apparent from the following description of the present invention.

SUMMARY OF THE INVENTION

In order to attain the objects described above, according to a first aspect of the invention, an imaging lens includes a first lens having negative refractive power; a second lens having negative refractive power; a third lens having positive refractive power; a fourth lens having positive refractive power; and a fifth lens having negative refractive power, arranged in this order from an object side to an image plane side.

According to the first aspect of the present invention, the first lens has an object-side surface and an image plane-side surface, curvature radii of which are both positive. The second lens has an object side-surface and an image plane-side surface, curvature radii of which are both positive. The third lens has an object-side surface, a curvature radius of which is positive, and an image plane-side surface, a curvature radius of which is negative. The fourth lens has an object-side surface, a curvature radius of which is positive, and an image plane-side surface, a curvature radius of which is negative. The fifth lens has an object-side surface and an image plane-side surface, curvature radii of which are both negative. Each of the first through the fourth lenses is made of a material having Abbe's number of between 45 and 75. The fifth lens is made of a material having Abbe's number of 20 to 40.

According to the first aspect of the present invention, when the whole lens system has a focal length f and the fifth lens has a focal length f5, the imaging lens satisfies the following conditional expression (1):

$$-1.5 < f5/f < -0.5 \qquad (1)$$

According to the first aspect of the present invention, in the imaging lens, each of the first through the fourth lenses is made of a material having Abbe's number of between 45 and 75 and the fifth lens is made of a material having Abbe's number of 20 to 40. Therefore, since Abbe's numbers of those four of the five lenses are larger than the lower limit of "45", it is possible to effectively restrain chromatic aberrations generated in those four lenses and suitably restrain a chromatic aberration of the whole lens system within suitable range. In addition, having the upper limit of the Abbe's number of each lens smaller than "75", it is possible to restrain cost of the lens materials.

In order to achieve a wide angle, according to the first aspect of the present invention, the imaging lens is provided with two lenses having negative refractive powers on the object side. With this configuration, it is possible to achieve a wide angle while keeping refractive powers of the two lenses having negative refractive powers, i.e., the first lens and the second lens. This is effective even in view of reducing production error sensitivity of the imaging lens. As the angle becomes wide, however, it matters how to correct a distortion and a field curvature. According to the first aspect of the present invention, in the imaging lens, only one lens is made of a high-dispersion material among the five lenses. Accordingly, the role of the fifth lens is more significant than that in a conventional imaging lens. The fifth lens is a lens provided most closely to the image plane in the imaging lens.

When the imaging lens satisfies the conditional expression (1), it is possible to restrain the field curvature within satisfactory range, while correcting a distortion and a chromatic aberration. When the value exceeds the upper limit of "−0.5", since the fifth lens has relatively strong refractive power relative to that of the whole lens system, it is easy to correct negative distortion, which is easily generated as the angle of view is widen, and it is easy to restrain insufficient correction of an axial chromatic aberration (a focal point at a short wavelength moves towards the object side relative to a focal position at a reference wavelength). However, a periphery of the image-forming surface curves to the image plane side. Accordingly, it is difficult to restrain the field curvature within satisfactory range. For this reason, it is difficult to obtain satisfactory image-forming performance.

On the other hand, when the value is below the lower limit of "−1.5", the axial chromatic aberration is insufficiently corrected and a chromatic aberration of magnification is also insufficiently corrected (an image-forming point at a short wavelength moves in a direction to be close to the optical axis relative to an image-forming point at a reference wavelength). In addition, since negative distortion also increases, it is difficult to obtain satisfactory image-forming performance.

According to a second aspect of the present invention, in the imaging lens in the first aspect, when the first lens has a focal length f1 and the second lens has a focal length f2, the imaging lens preferably satisfies the following conditional expressions (2) and (3):

$$-3.5 < f1/f < -1.5 \quad (2)$$

$$1.0 < f1/f2 < 1.5 \quad (3)$$

When the imaging lens satisfies the conditional expression (2), it is possible to reduce the size of the imaging lens, while restraining an incident angle of a light beam emitted from the imaging lens to an imaging element. As well known, an imaging element such as a CCD sensor or CMOS sensor has a so-called chief ray angle (CRA) set in advance, i.e. range of an incident angle of a light beam that can be taken in the sensor. By restraining an incident angle of a light beam emitted from the imaging lens to an image plane within the CRA range, it is possible to suitably restrain generation of shading, a phenomenon of dark image periphery.

When the value exceeds the upper limit of "−1.5" in the conditional expression (2), since the imaging lens has a long back focal length, while it is easier to restrain an incident angle of a light beam emitted from the imaging lens to an imaging element, it is difficult to achieve downsizing of the imaging lens. In addition, since the imaging-forming surface curves to the object side, it is difficult to obtain satisfactory image-forming performance. On the other hand, when the value is below the lower limit of "−3.5", since the back focal length is short, although it is advantageous for downsizing of the imaging lens, it is difficult to secure space to place an insert such as an infrared cutoff filter. Furthermore, an incident angle of a light beam emitted from the imaging lens to the imaging element is large, so that it is difficult to restrain generation of shading.

When the imaging lens satisfies the conditional expression (3), it is possible to satisfactorily correct a distortion and an astigmatism, while achieving downsizing of the imaging lens. When the value exceeds the upper limit of "1.5", a position of an incident pupil moves to the object side and the back focal length becomes long, and it is difficult to achieve downsizing of the imaging lens. Moreover, since the sagittal image surface in the astigmatism curves to the image plane side and the astigmatic difference increases, and negative distortion also increases, it is difficult to obtain satisfactory image-forming performance.

On the other hand, when the value is below the lower limit of "1.0", the incident pupil moves to the image plane side and the back focal length becomes short, so that, although it is advantageous for downsizing of the imaging lens, the sagittal image surface in the astigmatism curves to the object side and the astigmatic difference increases. Therefore, also in this case, it is difficult to obtain satisfactory image-forming performance.

The conditional expressions (2) and (3) set the distribution of refractive powers of the first lens and the second lens in the imaging lens. When the imaging lens satisfies the conditional expressions (2) and (3), it is easier to correct aberrations generated in the third lens and thereafter, while achieving widening of an angle of view of the imaging lens. Moreover, when widening of an angle of view is made by increasing refractive power of the first lens as in a typical conventional imaging lens, the shape of a concave surface of the first lens on an image plane side thereof becomes close to a semispherical shape. However, by satisfying the conditional expressions (2) and (3) while widening an angle of view with the two negative lenses, i.e. the first and the second lenses, it is possible to suitably restrain that the concave surface of first lens on the image plane side thereof becomes like a semispherical shape. Therefore, according to the second aspect of the present invention, the imaging lens is easy to evenly apply anti-reflection coating, etc., and it is possible to improve yield upon production of the imaging lens.

According to the imaging lens having the above-described configuration, the first lens and the second lens preferably have weaker refractive powers than each lens of the third lens to the fifth lens. When the first lens and the second lens have strong refractive powers, although it is easy to widen an angle, it is difficult to satisfactorily correct aberrations. In addition, the third lens preferably has weaker refractive power than any of the fourth lens to the fifth lens. As described above, since the lens made of high-dispersion material is only one, i.e. the fifth lens, in the imaging lens of the present invention, it is preferred that the fourth lens and the fifth lens have strong refractive powers also in view of correction of a chromatic aberration.

According to a third aspect of the present invention, in the imaging lens in the first aspect, an object-side surface of the second lens is preferably formed in an aspheric shape so as to direct a convex surface thereof to the object side near an optical axis and direct a concave surface thereof to the object side at periphery of the lens. With such a shape of the object-side surface of the second lens, it is possible to more satisfactorily correct a field curvature.

According to a fourth aspect of the present invention, in the imaging lens in the first aspect, when the third lens has a focal length f3 and the distance along an optical axis between the second lens and the third lens is dA, the imaging lens having the above-described configuration preferably satisfies the following conditional expressions (4) and (5):

$$0.5 < f3/f < 2.5 \quad (4)$$

$$0.5 < dA/f < 1.0 \quad (5)$$

When the imaging lens satisfies the conditional expression (4), it is possible to satisfactorily correct the astigmatism and a chromatic aberration, while downsizing the imaging lens. When the value exceeds the upper limit of "2.5", the back focal length of the imaging lens is long and it is difficult to attain downsizing of the imaging lens. In addition, the axial chromatic aberration is excessively corrected (a focal position at short wavelength moves to the image plane side relative to a focal position at a reference wavelength), and a chromatic aberration of magnification is insufficiently corrected. In this case, negative distortion also increases and it is difficult to obtain satisfactory image-forming performance. On the other hand, when the value is below the lower limit of "0.5", since the back focal length is short, although it is advantageous for downsizing of the imaging lens, an axial chromatic aberration is insufficiently corrected.

In addition, in case of an off-axis light beam entering in periphery of the image plane, since an image-forming surface at a short wavelength moves to the object side, flare is generated by so-called image surface displacement, and it is difficult to obtain satisfactory image-forming performance.

When the imaging lens satisfies the conditional expression (5), it is possible to satisfactorily a correct distortion, an astigmatism, and a chromatic aberration, while downsizing the imaging lens. When the value exceeds the upper limit of "1.0", although it is advantageous for correction of an axial chromatic aberration, the total length of the whole lens system and the back focal length become long, and it is difficult to reduce a size of the imaging lens. Moreover, since negative distortion increases and inward coma aberration is generated in off-axis light beam entering periphery of the image plane, it is difficult to obtain satisfactory image-forming performance.

On the other hand, when the value is below the lower limit of "0.5", since the axial chromatic aberration is insufficiently corrected and the sagittal image surface in the astigmatism and an image-forming surface at a short wavelength curve to the object side, it is difficult to obtain satisfactory image-forming performance. The third lens is a lens disposed most closely to the object side among the lenses having positive refractive powers, and is disposed behind the two negative lenses (on the image plane side), the first lens and the second lens. The position and the refractive power of the third lens in the imaging lens are important also for satisfactory correction of aberrations. When the imaging lens satisfies the conditional expressions (4) and (5), it is possible to satisfactorily correct aberrations while attaining downsizing of the imaging lens.

According to the present invention, the imaging lens is especially effective for an imaging lens that is required to have an angle of view of at least 120° (120°≤2ω).

According to the present invention, it is possible to attain both a wide angle of view and the satisfactory aberration correction of the imaging lens, and it is possible to provide the small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
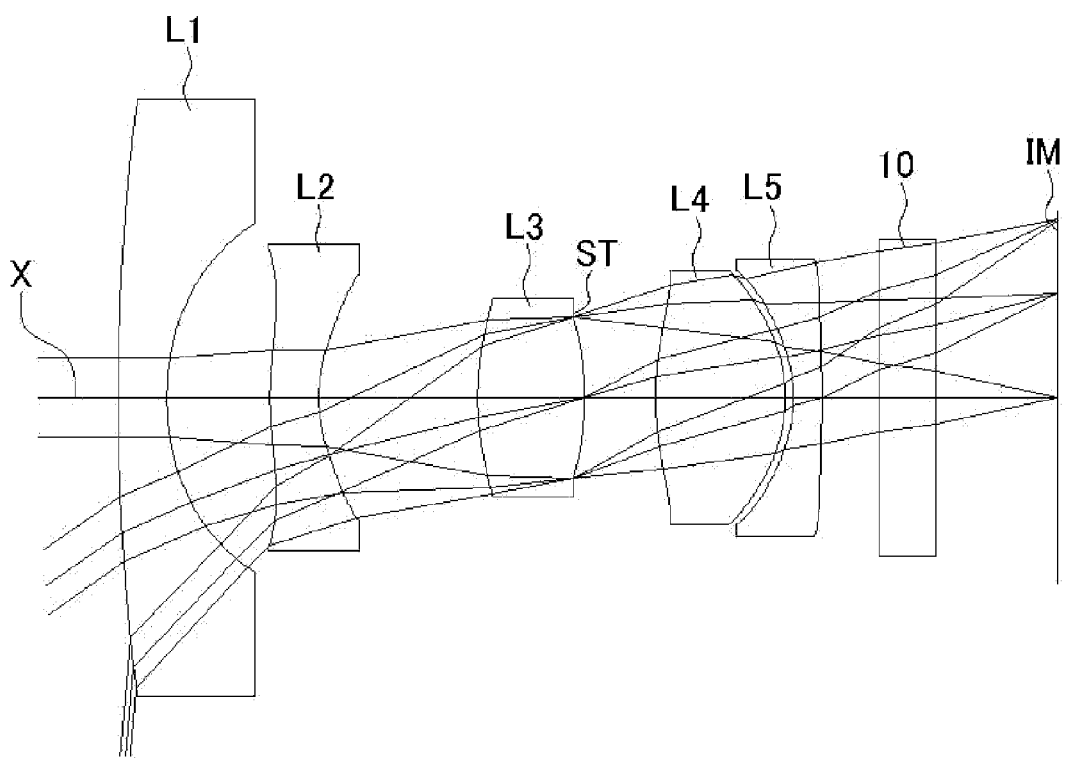
FIG. 1 shows a sectional view of a schematic configuration of an imaging lens in Numerical Data Example 1 according to an embodiment of the present invention.

As shown in FIG. 1, the imaging lens of the embodiment includes a first lens L1 having negative refractive power, a second lens L2 having negative refractive power, a third lens L3 having positive refractive power, an aperture stop ST, a fourth lens L4 having positive refractive power, and a fifth lens L5 having negative refractive power, arranged in the order from an object side to an image plane side. A filter 10 may be provided between the fifth lens L5 and an image plane IM. The filter 10 may be optionally omitted.

According to the imaging lens of the embodiment, each of the first lens L1 to the fourth lens L4 are made of materials having Abbe's numbers of between 45 and 75. On the other hand, the fifth lens L5 is made of a material having Abbe's number of between 20 and 40. More specifically, when the first lens L1 has Abbe's number vd1, the second lens L2 has Abbe's number vd2, the third lens L3 has Abbe's number vd3, the fourth lens L4 has Abbe's number vd4, and the fifth lens L5 has Abbe's number vd5, the imaging lens of the embodiment satisfies the following conditional expressions:

$$45 < vd1 < 75$$

$$45 < vd2 < 75$$

$$45 < vd3 < 75$$

$$45 < vd4 < 75$$

$$20 < vd5 < 40$$

The first lens L1 is formed in a shape, such that a curvature radius r1 of an object-side surface thereof and a curvature radius r2 of an image plane-side surface thereof are both positive, so as to a shape of a meniscus lens directing a convex surface thereof to the object side near the optical axis X. According to the embodiment, the first lens L1 is formed in a shape of a meniscus shape directing strongly concaved surface to the image plane side.

The second lens L2 is formed in a shape, such that a curvature radius r3 of an object-side surface thereof and a curvature radius r4 of an image plane-side surface thereof are both positive, so as to have a shape of a meniscus lens directing a convex surface thereof to the object side near the optical axis X. Among them, the object-side surface of the second lens L2 is formed as an aspheric shape, so as to direct a convex surface thereof to the object side near the optical axis X and direct the concave surface thereof to the object side at the periphery of the lens. In short, according to the embodiment, the second lens L2 is formed in a shape of a meniscus lens directing a convex surface thereof to the object side near the optical axis X, and formed in a shape of a biconcave lens at the periphery of the lens, which is away from the optical axis X.

The third lens L3 is formed in a shape, such that a curvature radius r5 of an object-side surface thereof is positive and a curvature radius r6 of an image plane-side surface thereof is negative, and formed in a shape of a biconvex lens near the optical axis X.

The fourth lens L4 is formed in a shape, such that a curvature radius r7 of the object-side surface thereof is positive and a curvature radius r8 of an image plane-side surface thereof is negative, and formed in a shape of a biconvex lens near the optical axis X. In addition, the fifth lens L5 is formed in a shape, such that a curvature radius r9 of an object-side surface thereof and a curvature radius r10 of an image plane-side surface thereof are both negative, and has a shape of a meniscus lens directing a concave surface thereof to the object side near the optical axis X.

Furthermore, the imaging lens of the embodiment satisfies the following conditional expressions. Therefore, according to the imaging lens of the embodiment, it is possible to achieve both widening an angle of view of the imaging lens and satisfactory aberration correction.

$$-1.5 < f5/f < -0.5 \quad (1)$$

$$-3.5 < f1/f < -1.5 \quad (2)$$

$$1.0 < f1/f2 < 1.5 \quad (3)$$

$$0.5 < f3/f2 < 2.5 \quad (4)$$

$$0.5 < dA/f < 1.0 \quad (5)$$

In the above conditional expressions:

f: Focal length of the whole lens system f1: Focal length of a first lens L1 f2: Focal length of a second lens L2 f3: Focal length of a third lens L3 f5: Focal length of a fifth lens L5 dA: Distance on an optical axis between the second lens L2 and the third lens L3

Furthermore, the imaging lens of the embodiment preferably satisfies the following conditional expression (6):

$$1.5 < f45/f < 3.5 \quad (6)$$

In the above expression, f45: Composite focal length of the fourth lens L4 and the fifth lens L5

When the imaging lens satisfies the conditional expression (6), it is possible to set refractive powers of the lenses disposed from the aperture stop ST to the image plane side. In the lens configuration of the imaging lens, the fourth lens L4 and the fifth lens L5 primarily correct chromatic aberrations. When the imaging lens satisfies the conditional expression (6), it is possible to more satisfactorily correct the chromatic aberrations. Here, it is not necessary to satisfy all of the conditional expressions, and it is achievable to obtain an effect corresponding to the respective conditional expression when any single one of the conditional expressions is individually satisfied.

In the embodiment, all lens surfaces of each lens are formed as an aspheric surface. When the aspheric surfaces applied to the lens surfaces have an axis Z in a direction of the optical axis, a height H in a direction perpendicular to the optical axis, a conical coefficient k, and aspheric coefficients $A_4$ and $A_6$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 \qquad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index for a d line, and vd represents Abbe's number for the d line, respectively. Here, aspheric surfaces are indicated with surface numbers i affixed with * (asterisk). In addition, a sum of surface spacing on the optical axis (length in air) from the object-side surface of the first lens L1 to the image plane IM is indicated as La.

Numerical Data Example 1

Basic data are shown below.
f=2.32 mm, Fno=2.2, ω=85.0°

Unit: mm

Surface Data

| Surface Number i | r | d | nd | vd |
|---|---|---|---|---|
| (Object) | ∞ | ∞ | | |
| 1* | 26.566 | 0.600 | 1.535 | 56.1 (=vd1) |
| 2* | 3.109 | 1.272 | | |
| 3* | 4.375 | 0.600 | 1.535 | 56.1 (=vd2) |
| 4* | 1.806 | 1.957 (=dA) | | |
| 5* | 3.396 | 1.316 | 1.535 | 56.1 (=vd3) |
| 6* (Stop) | −4.285 | 0.877 | | |
| 7* | 3.485 | 1.600 | 1.535 | 56.1 (=vd4) |
| 8* | −1.888 | 0.100 | | |
| 9* | −1.747 | 0.350 | 1.634 | 23.9 (=vd5) |
| 10* | −14.142 | 0.700 | | |
| 11 | ∞ | 0.700 | 1.517 | 64.1 |
| 12 | ∞ | 1.484 | | |
| (Image plane) | ∞ | | | | f1 = −6.64 mm
f2 = −6.26 mm
f3 = 3.77 mm
f4 = 2.55 mm
f5 = −3.18 mm
La = 11.32 mm

Aspheric Surface Data
First Surface $k = 0.000$, $A_4 = -3.355E-04$, $A_6 = 1.813E-05$
Second Surface $k = 0.000$, $A_4 = 4.435E-03$, $A_6 = 1.144E-03$
Third Surface $k = 0.000$, $A_4 = -4.839E-02$, $A_6 = 3.532E-03$
Fourth Surface $k = 0.000$, $A_4 = -7.570E-02$, $A_6 = 5.541E-03$
Fifth Surface $k = 0.000$, $A_4 = -1.551E-02$, $A_6 = -2.427E-03$
Sixth Surface $k = 0.000$, $A_4 = -2.195E-02$, $A_6 = 1.849E-03$
Seventh Surface $k = 0.000$, $A_4 = -2.487E-02$, $A_6 = -2.233E-03$
Eighth Surface $k = 0.000$, $A_4 = 1.784E-02$, $A_6 = 2.153E-03$
Ninth Surface $k = 0.000$, $A_4 = 4.608E-02$, $A_6 = -3.862E-04$
Tenth Surface $k = 0.000$, $A_4 = 2.056E-02$, $A_6 = -6.426E-03$ The values of the respective conditional expressions are as follows:

f5/f = −1.37
f1/f = −2.87
f1/f2 = 1.06
f3/f = 1.63
dA/f = 0.85
f45/f = 3.18

Accordingly, the imaging lens of Numerical Data Example 1 satisfies the above-described conditional expressions. Therefore, according to the imaging lens, it is possible to satisfactorily correct aberrations in spite of the wide angle thereof.

Figure 2:
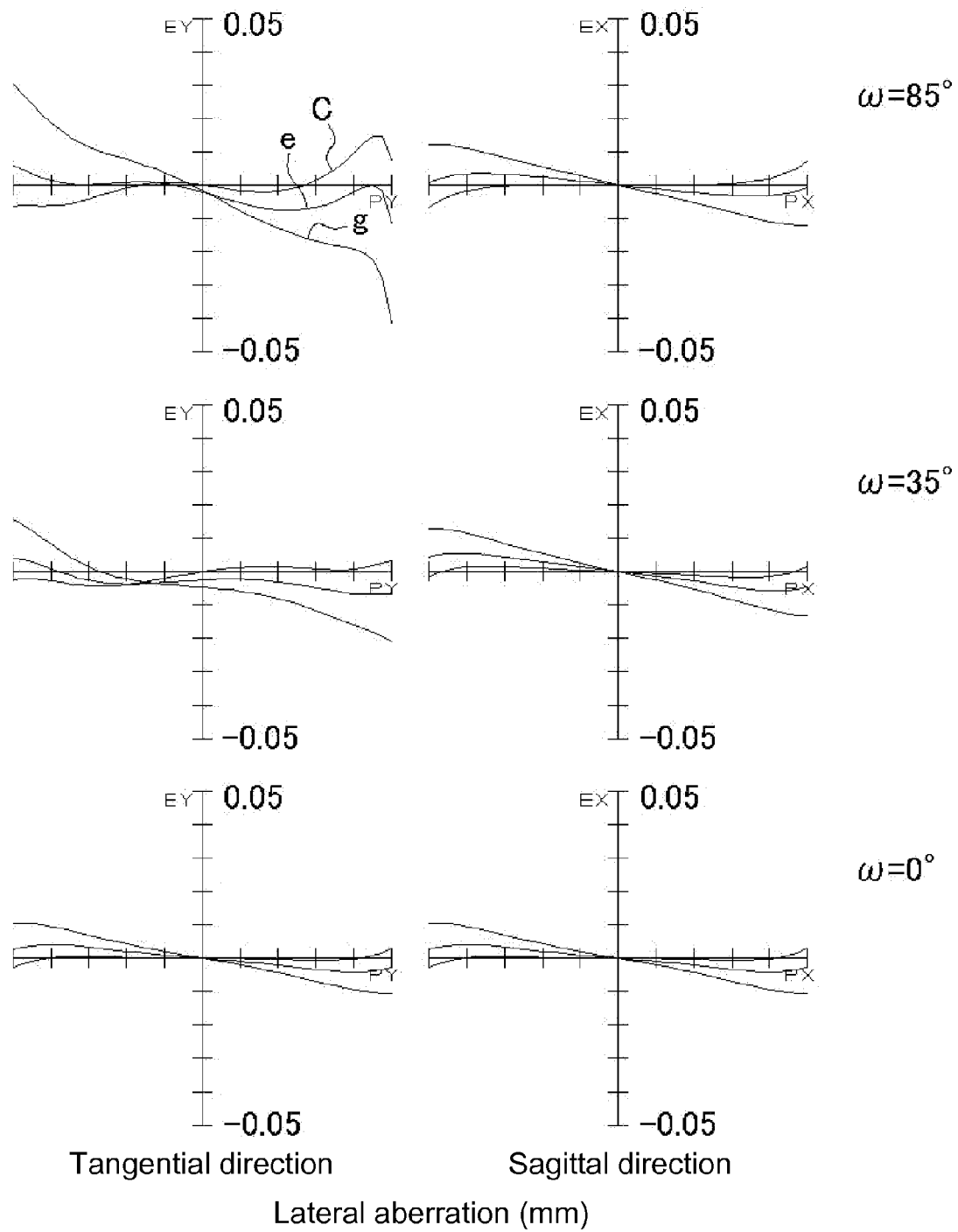
FIG. 2 is an aberration diagram showing a lateral aberration of the imaging lens of FIG. 1.
Figure 3:
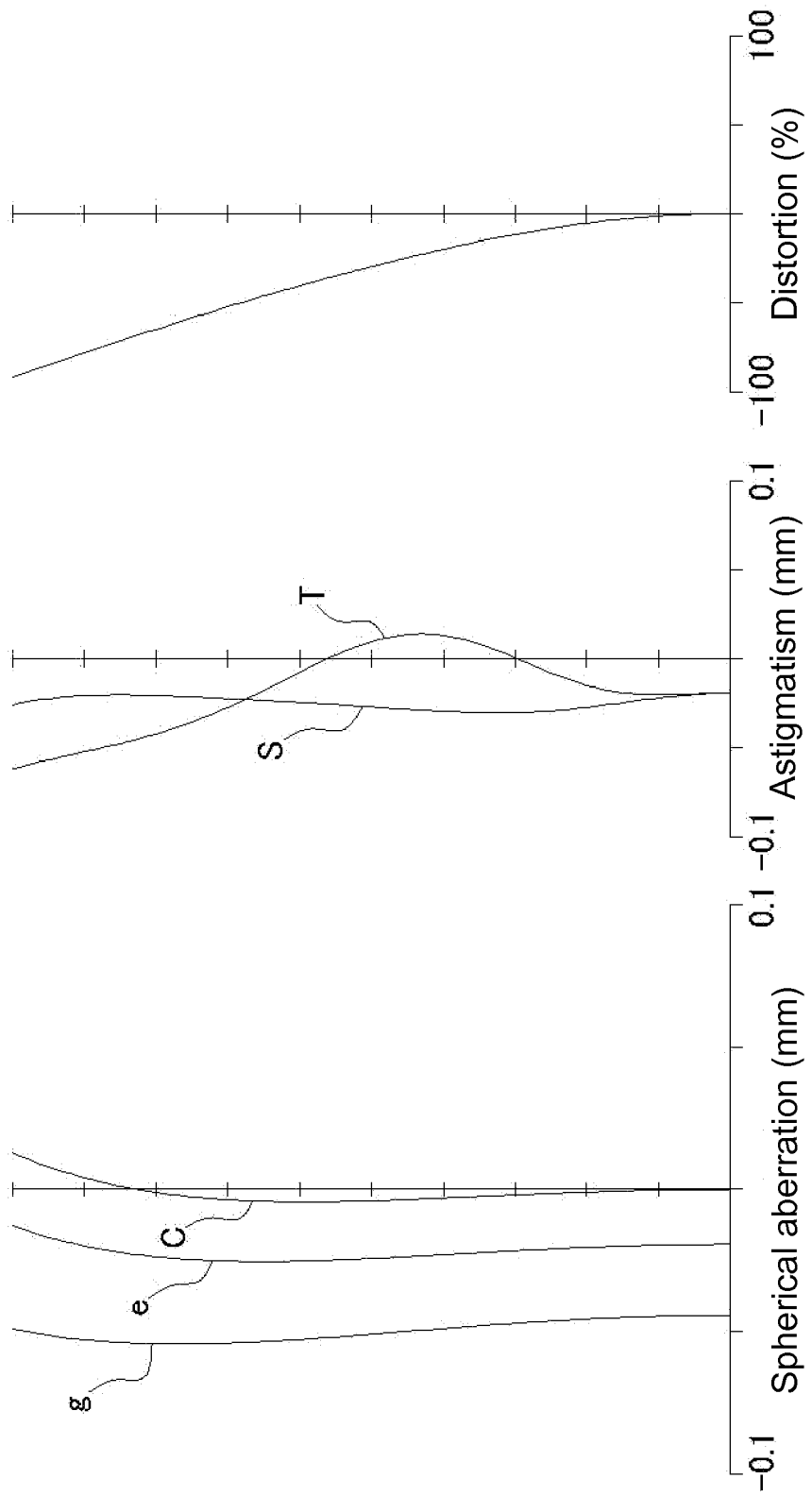
FIG. 3 is an aberration diagram showing a spherical aberration, astigmatism, and a distortion of the imaging lens of FIG. 1.
Figure 4:
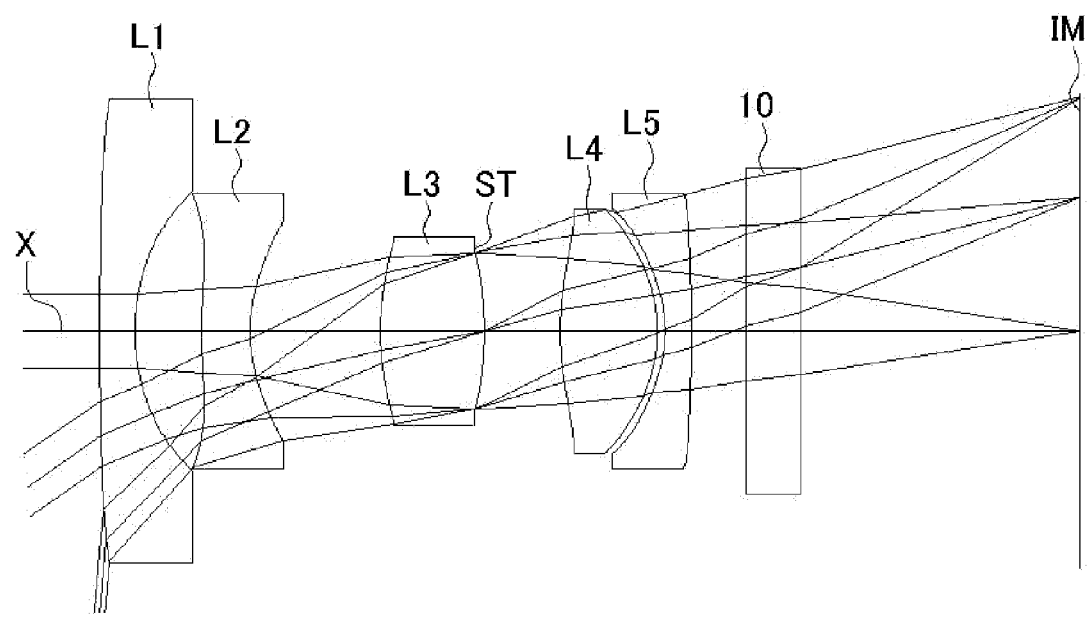
FIG. 4 shows a sectional view of a schematic configuration of an imaging lens in Numerical Data Example 2.

FIG. 2 shows a lateral aberration that corresponds to a half angle of view ω in the imaging lens of Numerical Data Example 1, which is divided into a tangential direction and a sagittal direction (which is the same in FIGS. 5, 8, 11, and 14). Furthermore, FIG. 3 shows a spherical aberration (mm), an astigmatism (mm), and a distortion (%), respectively. In the aberration diagrams, for the lateral aberration diagrams and spherical aberration diagrams, aberrations at each wavelength, i.e. a g line (435.84 nm), an e line (546.07 nm), and a C line (656.27 nm) are indicated. In the astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

Numerical Data Example 2

Basic data are shown below.
f=3.02 mm, Fno=3.1, ω=85.0°

Unit: mm

Surface Data

| Surface Number i | r | d | nd | vd |
|---|---|---|---|---|
| (Object) | ∞ | ∞ | | |
| 1* | 84.529 | 0.450 | 1.535 | 56.1 (=vd1) |
| 2* | 2.770 | 0.850 | | |
| 3* | 6.436 | 0.615 | 1.535 | 56.1 (=vd2) |
| 4* | 1.854 | 1.669 (=dA) | | |
| 5* | 3.532 | 1.327 | 1.535 | 56.1 (=vd3) |
| 6* (Stop) | −5.113 | 0.970 | | |
| 7* | 3.758 | 1.242 | 1.535 | 56.1 (=vd4) |
| 8* | −1.909 | 0.100 | | |
| 9* | −1.767 | 0.337 | 1.634 | 23.9 (=vd5) |
| 10* | −11.803 | 0.700 | | |
| 11 | ∞ | 0.700 | 1.517 | 64.1 |
| 12 | ∞ | 3.567 | | |
| (Image plane) | ∞ | | | | f1 = −5.36 mm
f2 = −5.11 mm
f3 = 4.12 mm
f4 = 2.56 mm
f5 = −3.32 mm
La = 12.29 mm

Aspheric Surface Data
First Surface $k = 0.000$, $A_4 = 4.189E-04$, $A_6 = 5.720E-05$
Second Surface $k = 0.000$, $A_4 = 5.528E-03$, $A_6 = 8.078E-04$
Third Surface $k = 0.000$, $A_4 = -5.022E-02$, $A_6 = 4.100E-03$
Fourth Surface $k = 0.000$, $A_4 = -7.165E-02$, $A_6 = 8.411E-03$
Fifth Surface $k = 0.000$, $A_4 = -1.130E-02$, $A_6 = -1.217E-03$
Sixth Surface $k = 0.000$, $A_4 = -2.008E-02$, $A_6 = 1.895E-03$ -continued Unit: mm Seventh Surface $k = 0.000, A_4 = -2.164E-02, A_6 = -1.941E-03$
Eighth Surface $k = 0.000, A_4 = 2.324E-02, A_6 = 4.284E-04$
Ninth Surface $k = 0.000, A_4 = 5.041E-02, A_6 = -1.857E-03$
Tenth Surface $k = 0.000, A_4 = 2.210E-02, A_6 = -5.974E-03$ The values of the respective conditional expressions are as follows:

f5/f = −1.10
f1/f = −1.78
f1/f2 = 1.05
f3/f = 1.37
dA/f = 0.55
f45/f = 2.52

Accordingly, the imaging lens of Numerical Data Example 2 satisfies the above-described conditional expressions. Therefore, according to the imaging lens, it is possible to satisfactorily correct aberrations in spite of the wide angle thereof.

Figure 5:
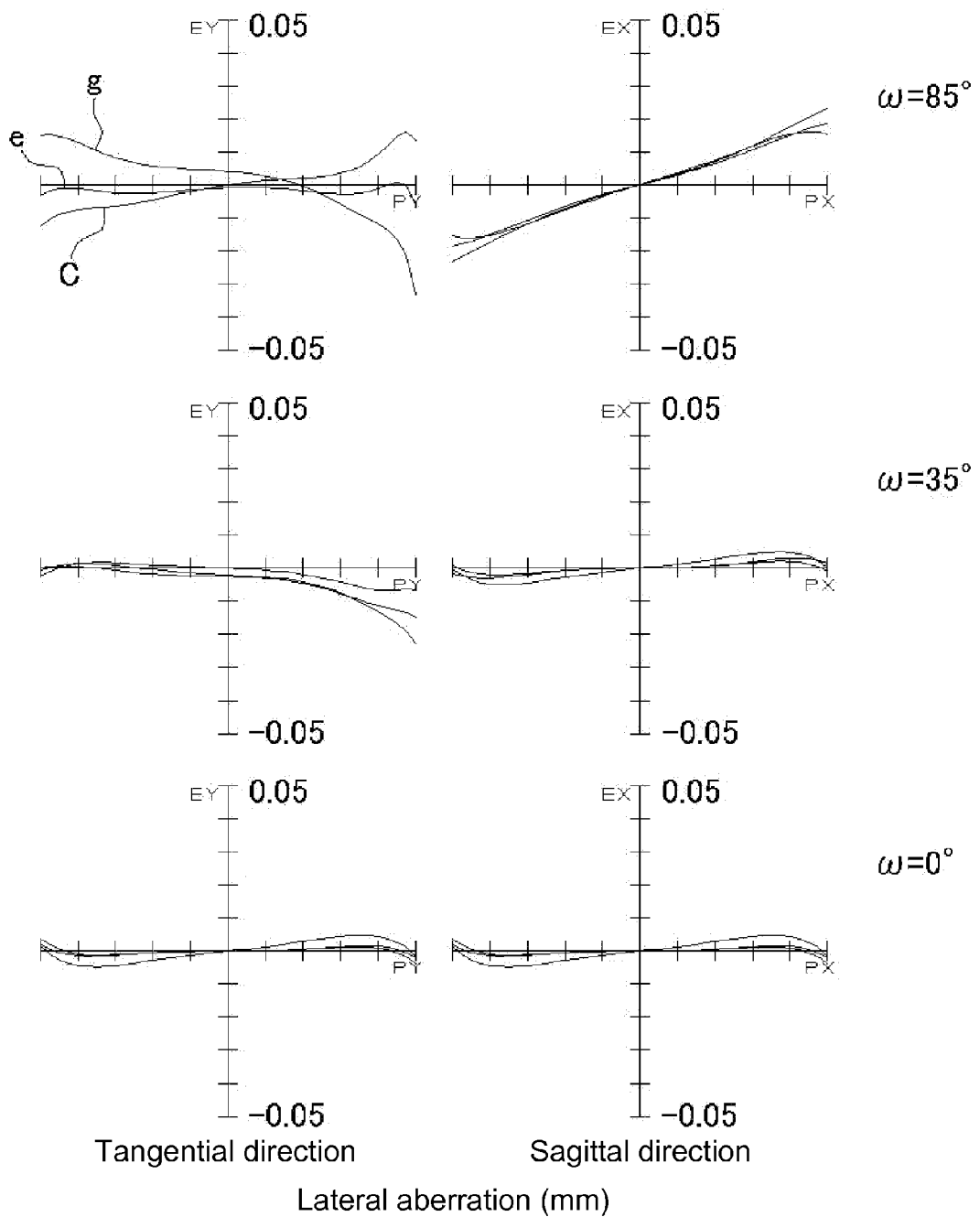
FIG. 5 is an aberration diagram showing a lateral aberration of the imaging lens of FIG. 4.
Figure 6:
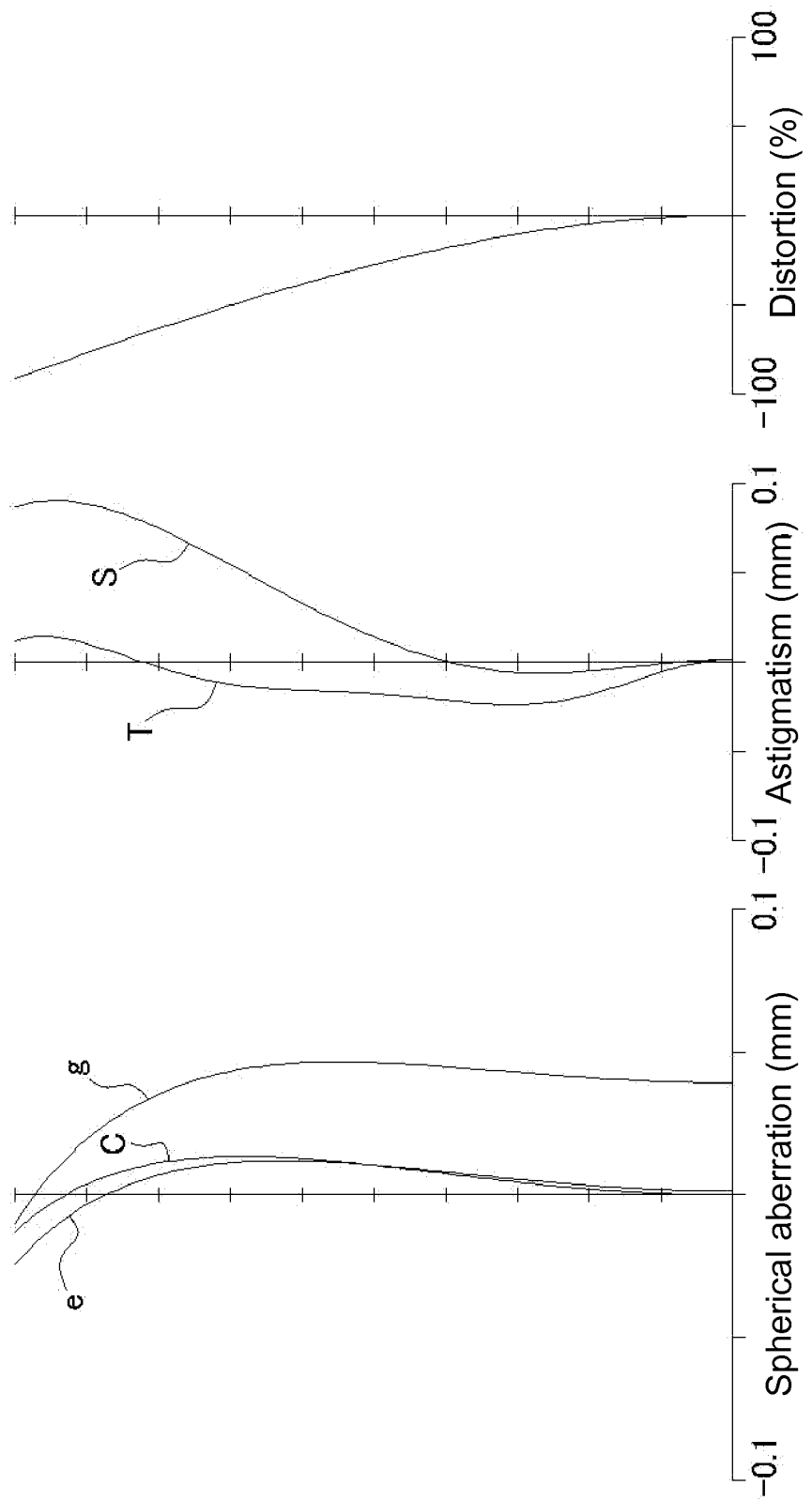
FIG. 6 is an aberration diagram showing a spherical aberration, astigmatism, and a distortion of the imaging lens of FIG. 4.
Figure 7:
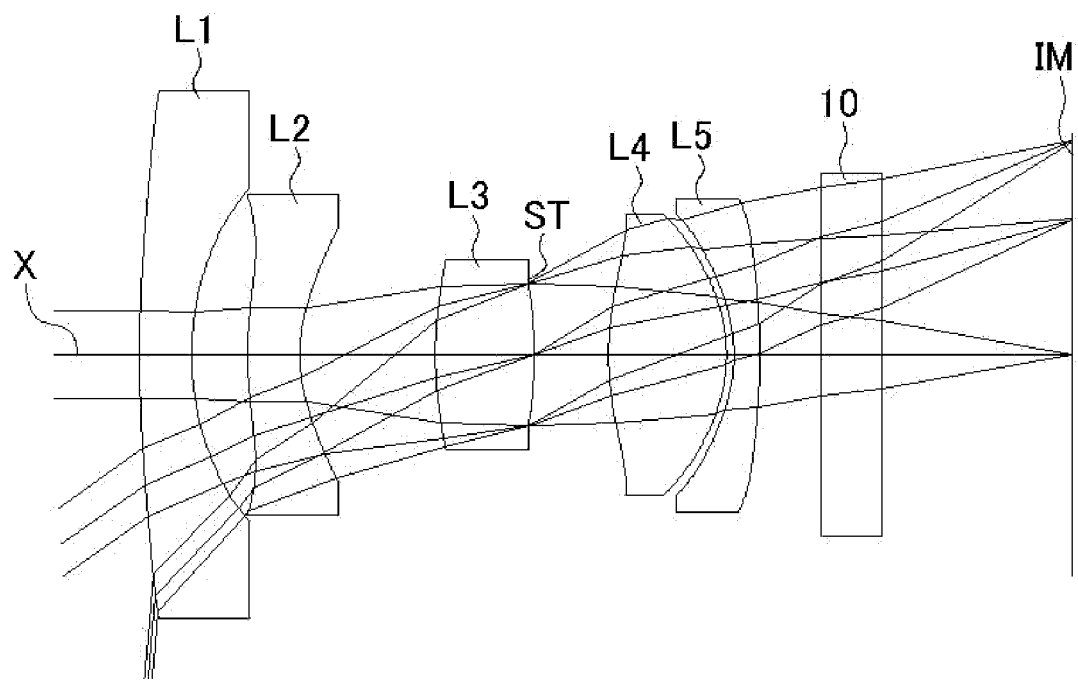
FIG. 7 shows a sectional view of a schematic configuration of an imaging lens in Numerical Data Example 3.

FIG. 5 shows the lateral aberration that corresponds to a half angle of view ω in the imaging lens of Numerical Data Example 2. FIG. 6 shows a spherical aberration (mm), an astigmatism (mm), and a distortion (%), respectively. As shown in FIGS. 5 and 6, according to the imaging lens of Numerical Data Example 2, the aberrations are satisfactorily corrected.

Numerical Data Example 3

Basic data are shown below.
f=2.82 mm, Fno=2.7, ω=85.0°

Unit: mm

Surface Data

| Surface Number i | r | d | nd | vd |
|---|---|---|---|---|
| (Object) | ∞ | ∞ | | |
| 1* | 15.000 | 0.600 | 1.535 | 56.1 (=vd1) |
| 2* | 3.343 | 0.638 | | |
| 3* | 3.903 | 0.600 | 1.535 | 56.1 (=vd2) |
| 4* | 1.813 | 1.556 (=dA) | | |
| 5* | 4.338 | 1.135 | 1.535 | 56.1 (=vd3) |
| 6* (Stop) | −5.834 | 0.853 | | |
| 7* | 3.240 | 1.356 | 1.535 | 56.1 (=vd4) |
| 8* | −1.877 | 0.085 | | |
| 9* | −1.830 | 0.300 | 1.634 | 23.9 (=vd5) |
| 10* | −6.420 | 0.700 | | |
| 11 | ∞ | 0.700 | 1.517 | 64.1 |
| 12 | ∞ | 2.177 | | |
| (Image plane) | ∞ | | | | f1 = −8.19 mm
f2 = −7.03 mm
f3 = 4.84 mm
f4 = 2.45 mm
f5 = −4.14 mm
La = 10.46 mm

-continued

Unit: mm

Aspheric Surface Data
First Surface $k = 0.000, A_4 = -2.242E-03, A_6 = 1.294E-04$
Second Surface $k = 0.000, A_4 = 2.039E-03, A_6 = 5.002E-04$
Third Surface $k = 0.000, A_4 = -5.092E-02, A_6 = 3.136E-03$
Fourth Surface $k = 0.000, A_4 = -7.343E-02, A_6 = 4.920E-03$
Fifth Surface $k = 0.000, A_4 = -1.474E-02, A_6 = 9.732E-04$
Sixth Surface $k = 0.000, A_4 = -2.884E-02, A_6 = 4.104E-03$
Seventh Surface $k = 0.000, A_4 = -2.625E-02, A_6 = -2.489E-03$
Eighth Surface $k = 0.000, A_4 = 2.021E-02, A_6 = 2.992E-03$
Ninth Surface $k = 0.000, A_4 = 4.532E-02, A_6 = -2.776E-05$
Tenth Surface $k = 0.000, A_4 = 2.245E-02, A_6 = -6.487E-03$ The values of the respective conditional expressions are as follows:

f5/f = −1.47
f1/f = −2.90
f1/f2 = 1.16
f3/f = 1.71
dA/f = 0.55
f45/f = 1.74

Accordingly, the imaging lens of Numerical Data Example 3 satisfies the above-described conditional expressions. Therefore, according to the imaging lens, it is possible to satisfactorily correct aberrations in spite of the wide angle thereof.

Figure 8:
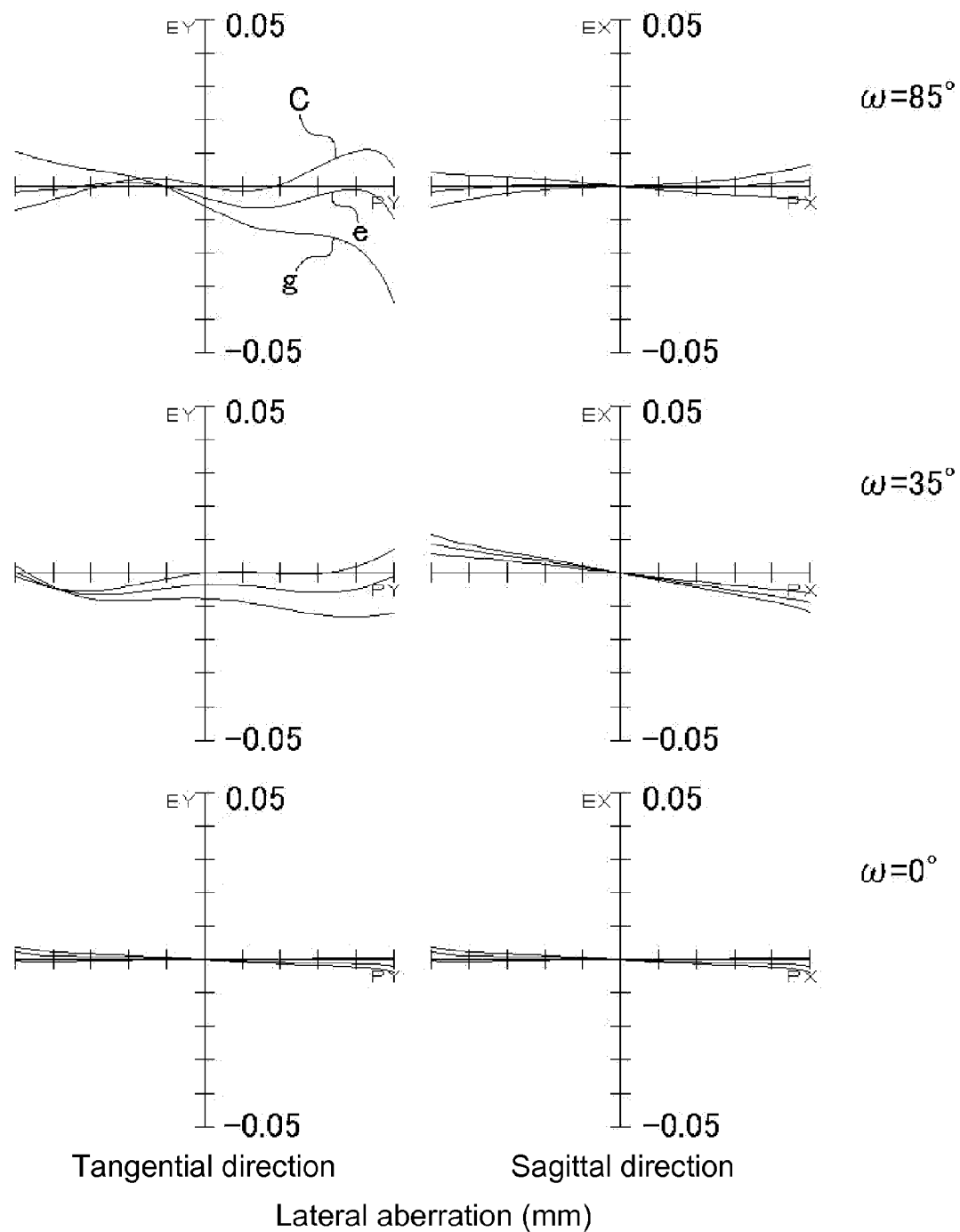
FIG. 8 is an aberration diagram showing a lateral aberration of the imaging lens of FIG. 7.
Figure 9:
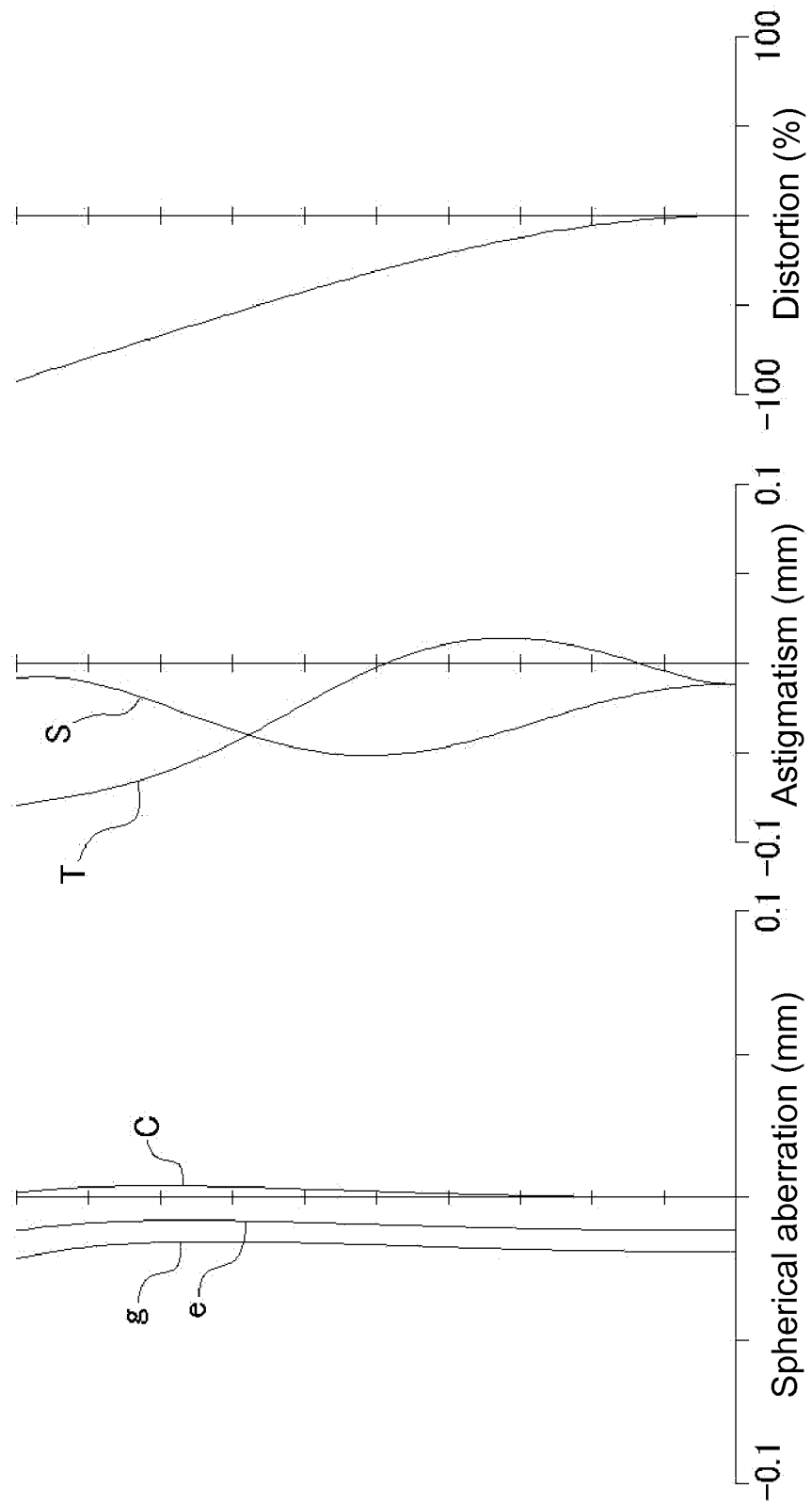
FIG. 9 is an aberration diagram showing a spherical aberration, astigmatism, and a distortion of the imaging lens of FIG. 7.
Figure 10:
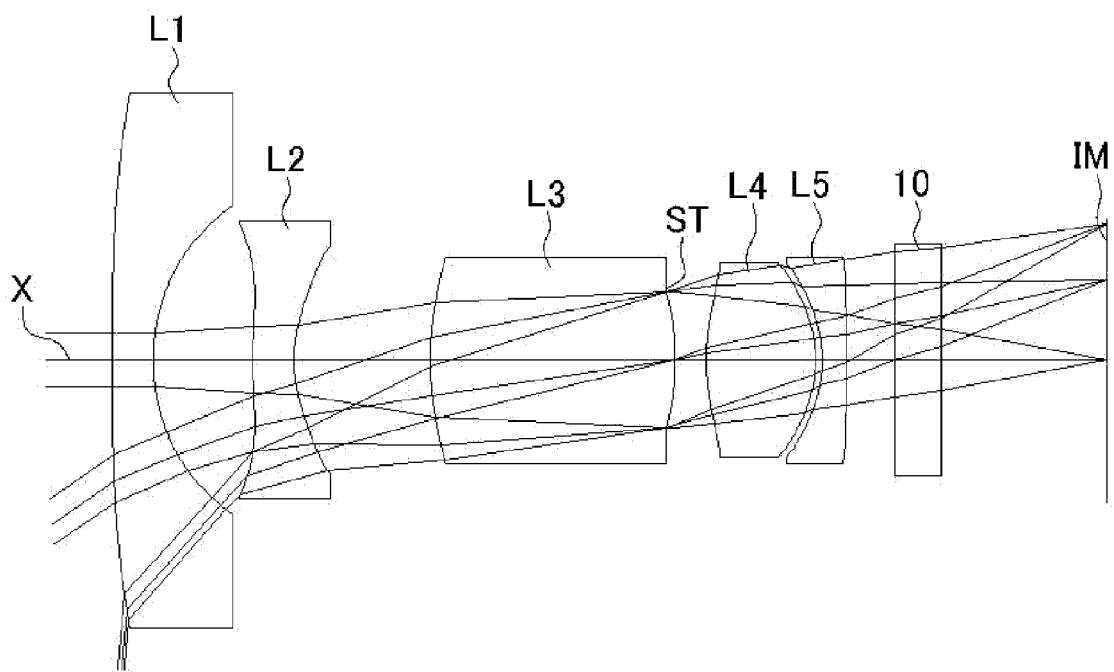
FIG. 10 shows a sectional view of a schematic configuration of an imaging lens in Numerical Data Example 4.

FIG. 8 shows the lateral aberration that corresponds to a half angle of view ω in the imaging lens of Numerical Data Example 3. FIG. 9 shows a spherical aberration (mm), an astigmatism (mm), and a distortion (%), respectively. As shown in FIGS. 8 and 9, according to the imaging lens of Numerical Data Example 3, the aberrations are satisfactorily corrected.

Numerical Data Example 4

Basic data are shown below.
f=2.09 mm, Fno=2.6, ω=85.0°

Unit: mm

Surface Data

| Surface Number i | r | d | nd | vd |
|---|---|---|---|---|
| (Object) | ∞ | ∞ | | |
| 1* | 123.922 | 0.600 | 1.535 | 56.1 (=vd1) |
| 2* | 3.006 | 1.456 | | |
| 3* | 6.933 | 0.600 | 1.535 | 56.1 (=vd2) |

-continued

Unit: mm

| | r | d | nd | vd |
|---|---|---|---|---|
| 4* | 1.984 | 1.996 (=dA) | | |
| 5* | 4.432 | 3.587 | 1.535 | 56.1 (=vd3) |
| 6* (Stop) | −4.718 | 0.461 | | |
| 7* | 3.176 | 1.600 | 1.535 | 56.1 (=vd4) |
| 8* | −1.909 | 0.100 | | |
| 9* | −1.835 | 0.350 | 1.634 | 23.9 (=vd5) |
| 10* | −33.082 | 0.700 | | |
| 11 | ∞ | 0.700 | 1.517 | 64.1 |
| 12 | ∞ | 2.411 | | |
| (Image plane) | ∞ | | | | f1 = −5.77 mm
f2 = −5.43 mm
f3 = 4.95 mm
f4 = 2.50 mm
f5 = −3.08 mm
La = 14.32 mm

Aspheric Surface Data
First Surface k = 0.000, $A_4$ = 1.293E−03, $A_6$ = −3.312E−05
Second Surface k = 0.000, $A_4$ = 3.961E−03, $A_6$ = 2.003E−04
Third Surface k = 0.000, $A_4$ = −4.747E−02, $A_6$ = 4.309E−03
Fourth Surface k = 0.000, $A_4$ = −6.486E−02, $A_6$ = 5.650E−03
Fifth Surface k = 0.000, $A_4$ = −7.403E−03, $A_6$ = −2.905E−05
Sixth Surface k = 0.000, $A_4$ = −2.456E−02, $A_6$ = 6.005E−03
Seventh Surface k = 0.000, $A_4$ = −3.361E−02, $A_6$ = 1.761E−03
Eighth Surface k = 0.000, $A_4$ = 1.734E−02, $A_6$ = 3.224E−03
Ninth Surface k = 0.000, $A_4$ = 4.374E−02, $A_6$ = −2.928E−03
Tenth Surface k = 0.000, $A_4$ = 1.183E−02, $A_6$ = −6.918E−03

The values of the respective conditional expressions are as follows:

f5/f = −1.47
f1/f = −2.76
f1/f2 = 1.06
f3/f = 2.37
dA/f = 0.95
f45/f = 3.34

Accordingly, the imaging lens of Numerical Data Example 4 satisfies the above-described conditional expressions. Therefore, according to the imaging lens, it is possible to satisfactorily correct aberrations in spite of the wide angle thereof.

Figure 11:
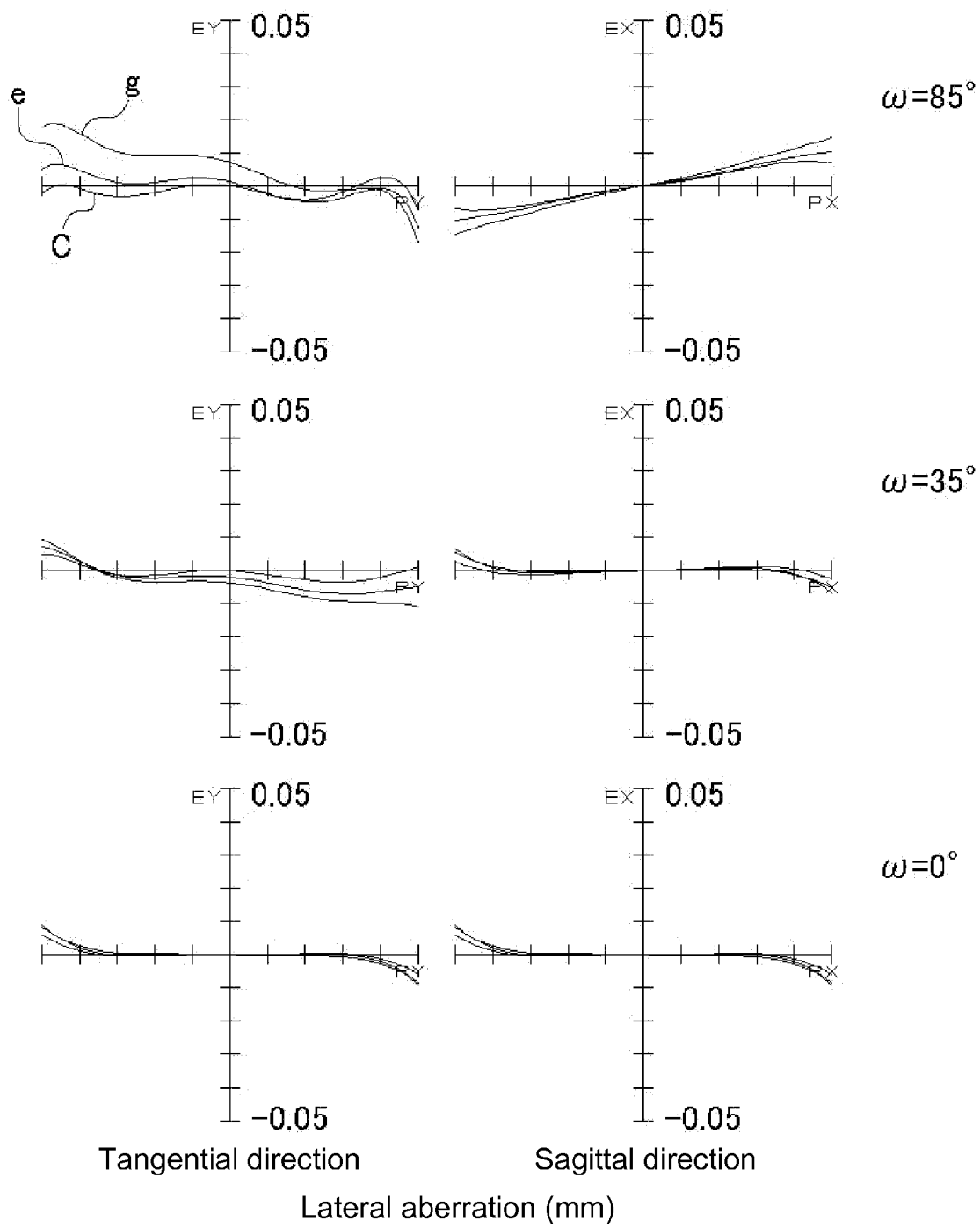
FIG. 11 is an aberration diagram showing a lateral aberration of the imaging lens of FIG. 10.
Figure 12:
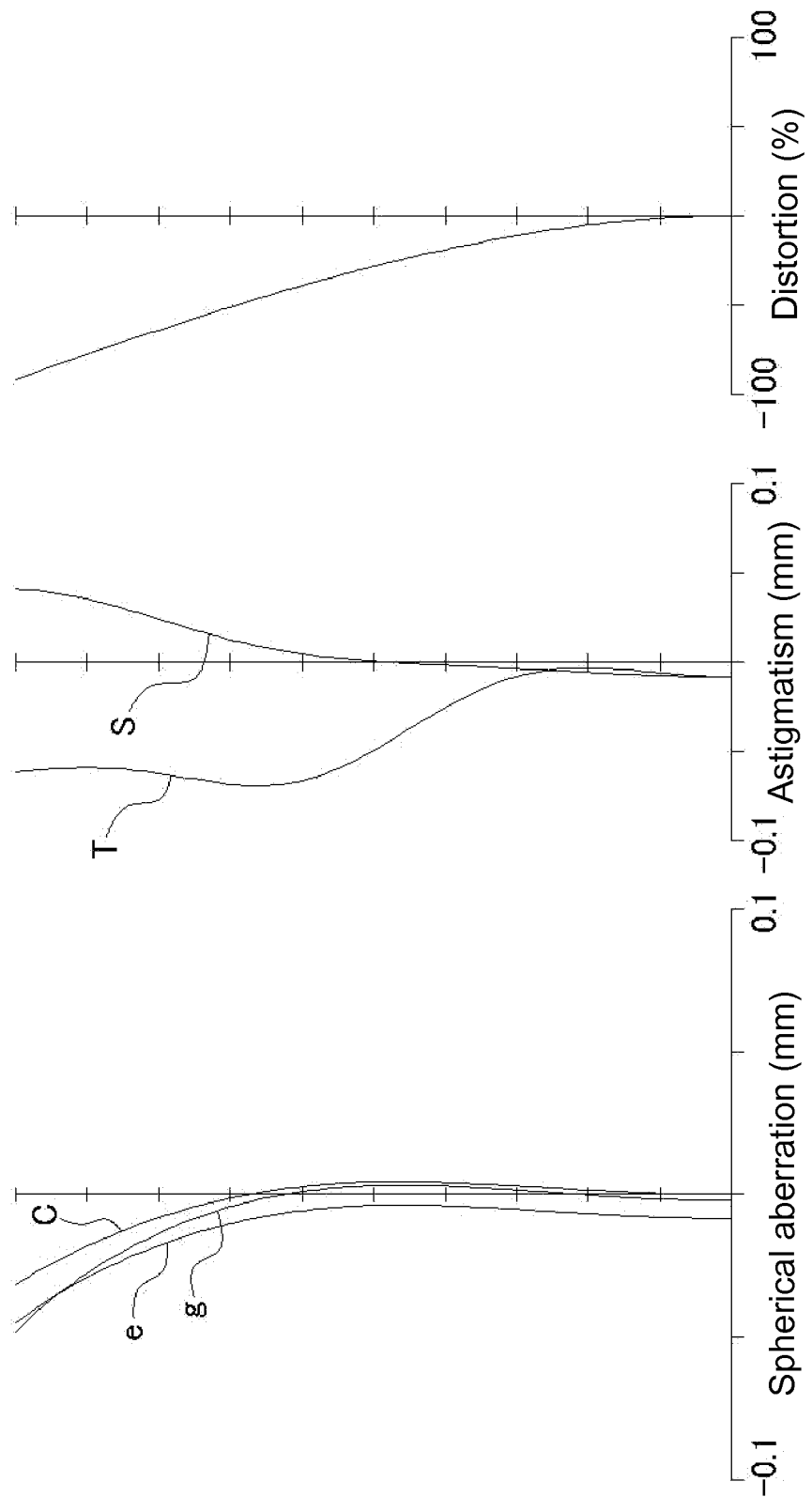
FIG. 12 is an aberration diagram showing a spherical aberration, astigmatism, and a distortion of the imaging lens of FIG. 10.
Figure 13:
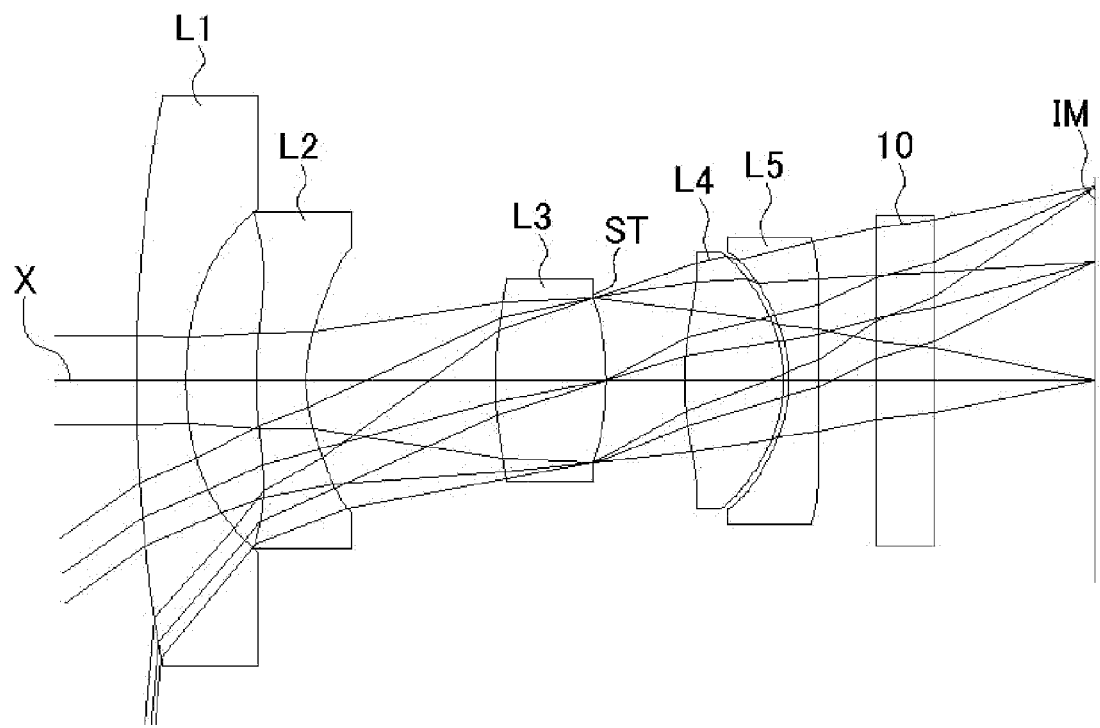
FIG. 13 shows a sectional view of a schematic configuration of an imaging lens in Numerical Data Example 5.

FIG. 11 shows the lateral aberration that corresponds to a half angle of view ω in the imaging lens of Numerical Data Example 4. FIG. 12 shows a spherical aberration (mm), an astigmatism (mm), and a distortion (%), respectively. As shown in FIGS. 11 and 12, according to the imaging lens of Numerical Data Example 4, the aberrations are satisfactorily corrected.

Numerical Data Example 5

Basic data are shown below.
f=2.70 mm, Fno=2.4, ω=85.0°

Unit: mm

Surface Data

| Surface Number i | r | d | nd | vd |
|---|---|---|---|---|
| (Object) | ∞ | ∞ | | |
| 1* | 17.169 | 0.600 | 1.535 | 56.1 (=vd1) |
| 2* | 3.791 | 0.850 | | |
| 3* | 4.328 | 0.600 | 1.535 | 56.1 (=vd2) |
| 4* | 1.815 | 2.284 (=dA) | | |
| 5* | 4.078 | 1.336 | 1.535 | 56.1 (=vd3) |
| 6* (Stop) | −3.905 | 0.948 | | |
| 7* | 3.397 | 1.198 | 1.535 | 56.1 (=vd4) |
| 8* | −1.789 | 0.069 | | |
| 9* | −1.687 | 0.349 | 1.634 | 23.9 (=vd5) |
| 10* | −66.371 | 0.700 | | |
| 11 | ∞ | 0.700 | 1.517 | 64.1 |
| 12 | ∞ | 1.932 | | |
| (Image plane) | ∞ | | | | f1 = −9.24 mm
f2 = −6.37 mm
f3 = 3.96 mm
f4 = 2.38 mm
f5 = −2.74 mm
La = 11.33 mm

Aspheric Surface Data
First Surface k = 0.000, $A_4$ = −7.831E−04, $A_6$ = 5.038E−05
Second Surface k = 0.000, $A_4$ = 1.056E−02, $A_6$ = 6.703E−04
Third Surface k = 0.000, $A_4$ = −4.545E−02, $A_6$ = 3.313E−03
Fourth Surface k = 0.000, $A_4$ = −7.999E−02, $A_6$ = 6.665E−03
Fifth Surface k = 0.000, $A_4$ = −1.669E−02, $A_6$ = −3.930E−03
Sixth Surface k = 0.000, $A_4$ = −2.475E−02, $A_6$ = 1.566E−03
Seventh Surface k = 0.000, $A_4$ = −2.968E−02, $A_6$ = −4.230E−03
Eighth Surface k = 0.000, $A_4$ = 1.775E−02, $A_6$ = 3.028E−03
Ninth Surface k = 0.000, $A_4$ = 5.003E−02, $A_6$ = −6.319E−05
Tenth Surface k = 0.000, $A_4$ = 1.433E−02, $A_6$ = −7.012E−03

The values of the respective conditional expressions are as follows:

f5/f = −1.01
f1/f = −3.43
f1/f2 = 1.45
f3/f = 1.47
dA/f = 0.85
f45/f = 3.40

Accordingly, the imaging lens of Numerical Data Example 5 satisfies the above-described conditional expressions. Therefore, according to the imaging lens, it is possible to satisfactorily correct aberrations in spite of the wide angle thereof.

Figure 14:
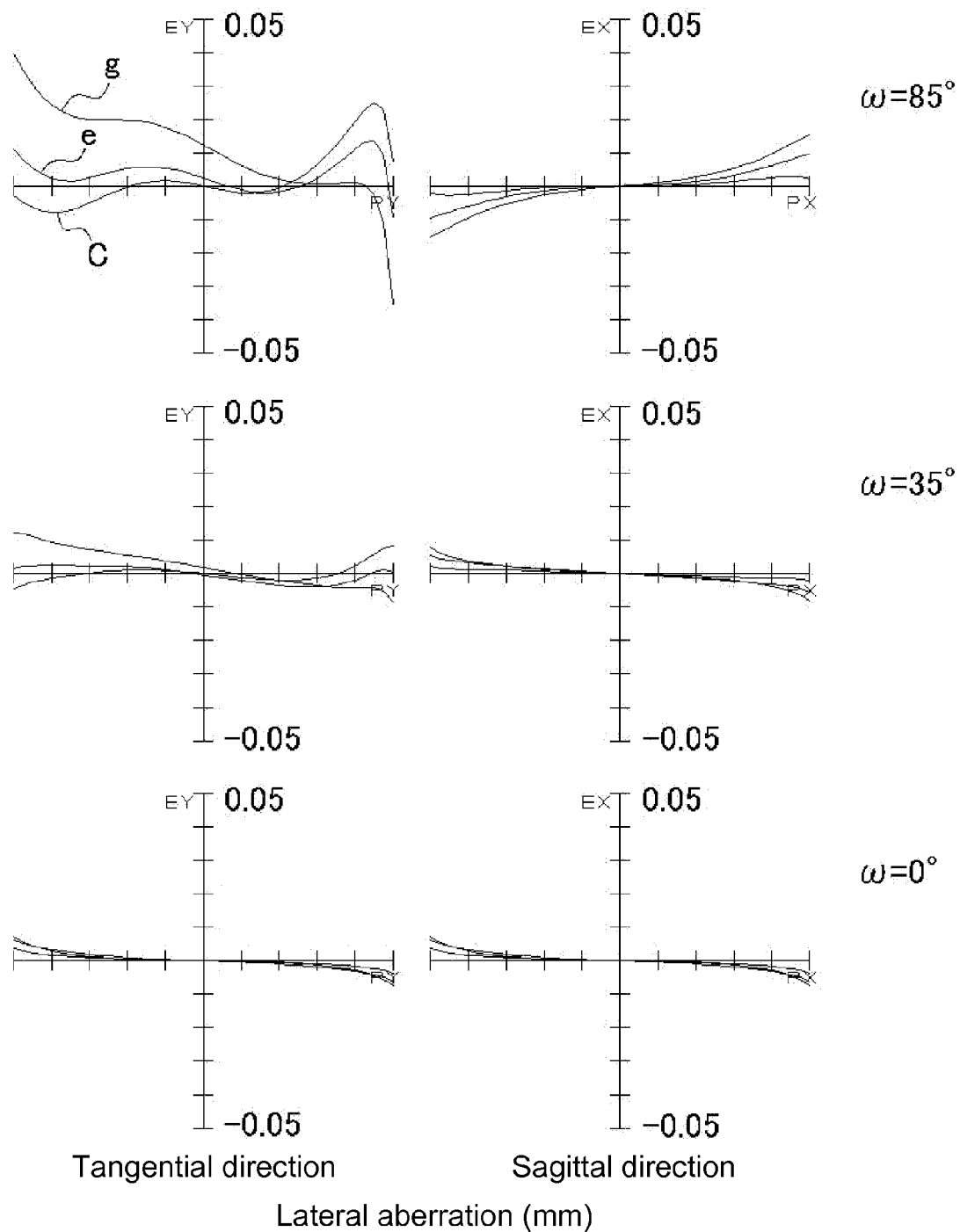
FIG. 14 is an aberration diagram showing a lateral aberration of the imaging lens of FIG. 13.
Figure 15:
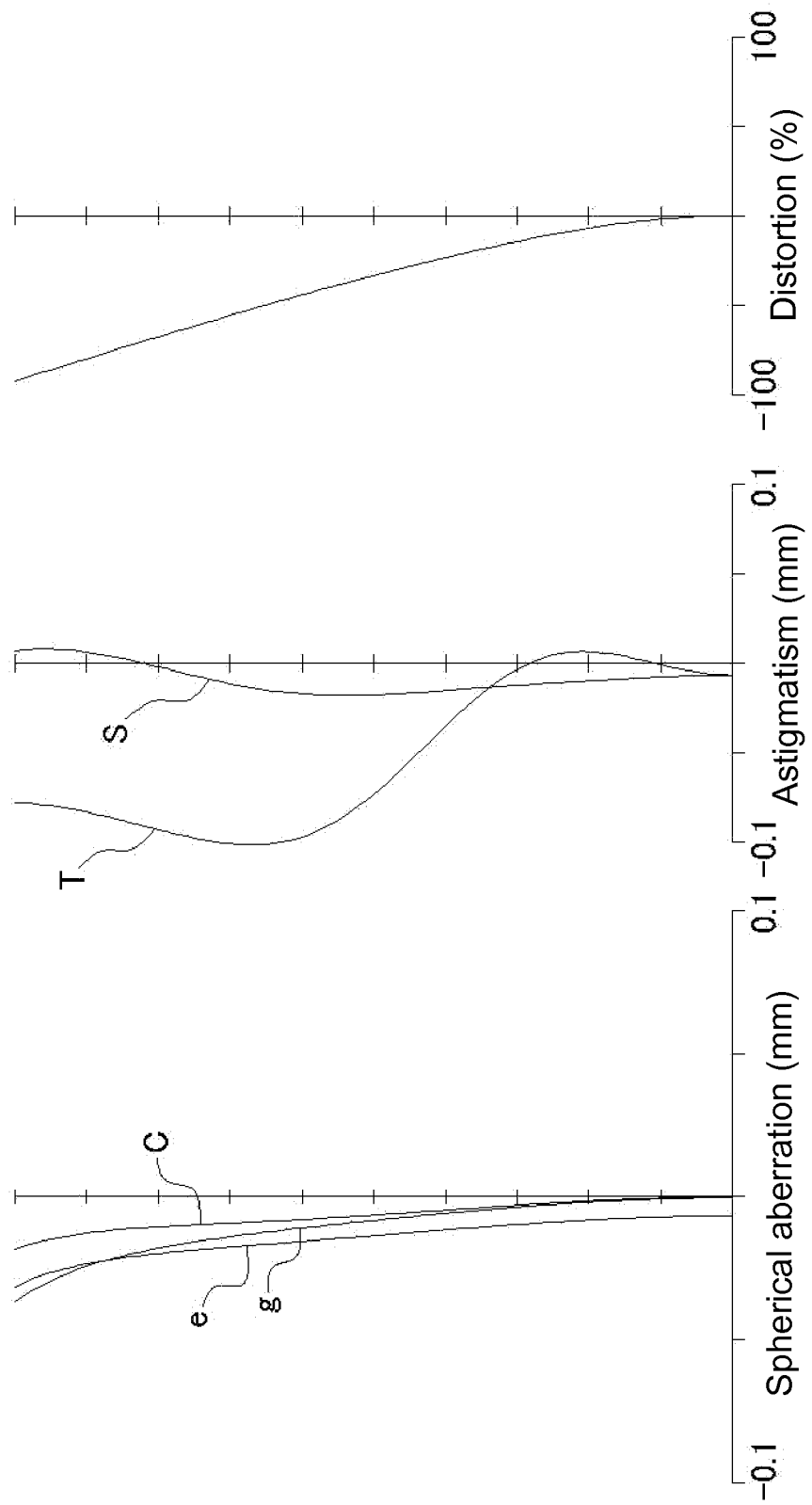
FIG. 15 is an aberration diagram showing a spherical aberration, astigmatism, and a distortion of the imaging lens of FIG. 13.

FIG. 14 shows the lateral aberration that corresponds to a half angle of view A in the imaging lens of Numerical Data Example 5. FIG. 15 shows a spherical aberration (mm), an astigmatism (mm), and a distortion (%), respectively. As shown in FIGS. 14 and 15, according to the imaging lens of Numerical Data Example 5, the aberrations are satisfactorily corrected.

Here, in any of the above-described Numerical Data Examples, a surface of each lens is formed as an aspheric surface, but it is also possible to form all or a part of the lens surfaces of the lenses that compose the imaging lens as spherical surfaces, as long as it is allowed in view of the total length of the imaging lens and required optical performances.

Therefore, applying the imaging lens of the embodiment in an imaging optical system such as cellular phones, digital still cameras, portable information terminals, monitoring cameras, onboard cameras, and network cameras, it is possible to provide a small camera with satisfactorily corrected aberrations in spite of a wide angle thereof.

The present invention may be applied in a device that requires satisfactory aberration correcting ability as well as a wide imaging angle of view as an imaging lens, for example, in an imaging lens for mounting in a device such as a cellular phone, a security camera, a onboard camera.

The disclosure of Japanese Patent Application No. 2012-237727, filed on Oct. 29, 2012, is incorporated in the application by reference.

While the present invention has been explained with reference to the specific embodiments of the present invention, the explanation is illustrative and the present invention is limited only by the appended claims.

What is claimed is:
1. An imaging lens comprising:
a first lens having negative refractive power;
a second lens;
a third lens;
a fourth lens; and
a fifth lens, arranged in this order from an object side to an image plane side,
wherein said second lens has a surface on the object side formed into an aspheric shape,
said first lens, said second lens, said third lens, and said fourth lens are formed of a material having an Abbe's number between 45 and 75,
said fifth lens is formed of a material having an Abbe's number between 20 and 40, and
said first lens has a focal length f1 so that the following conditional expression is satisfied:

$$-3.5 < f1/f < -1.5$$

where f is a focal length of a whole lens system.
2. The imaging lens according to claim 1, wherein said fifth lens has a focal length f5 so that the following conditional expression is satisfied:

$$-1.5 < f5/f < -0.5.$$

3. The imaging lens according to claim 1, wherein said first lens has a focal length f1 and said second lens has a focal length f2 so that the following conditional expression is satisfied:

$$1.0 < f1/f2 < 1.5.$$

4. The imaging lens according to claim 1, wherein said third lens has a focal length f3 so that the following conditional expression is satisfied:

$$0.5 < f3/f < 2.5.$$

5. The imaging lens according to claim 1, wherein said second lens is situated away from the third lens by a distance dA on an optical axis thereof so that the following conditional expression is satisfied:

$$0.5 < dA/f < 1.0.$$

6. An imaging lens comprising:
a first lens having negative refractive power;
a second lens having negative refractive power;
a third lens;
a fourth lens; and
a fifth lens, arranged in this order from an object side to an image plane side,
wherein said second lens has a surface on the object side formed into an aspheric shape,
said fifth lens has a surface on the image plane side having a negative curvature radius, and
said fifth lens has a focal length f5 so that the following conditional expression is satisfied:

$$-1.5 < f5/f < -0.5$$

where f is a focal length of a whole lens system.
7. The imaging lens according to claim 6, wherein said first lens has a focal length f1 and said second lens has a focal length f2 so that the following conditional expression is satisfied:

$$1.0 < f1/f2 < 1.5.$$

8. The imaging lens according to claim 6, wherein said third lens has a focal length f3 so that the following conditional expression is satisfied:

$$0.5 < f3/f < 2.5.$$

9. The imaging lens according to claim 6, wherein said second lens is situated away from the third lens by a distance dA on an optical axis thereof so that the following conditional expression is satisfied:

$$0.5 < dA/f < 1.0.$$

10. An imaging lens comprising:
a first lens having negative refractive power;
a second lens;
a third lens;
a fourth lens; and
a fifth lens, arranged in this order from an object side to an image plane side,
wherein said second lens has a surface on the object side formed into an aspheric shape, and
said third lens has a focal length f3, said fifth lens has a focal length f5, and said second lens is situated away from the third lens by a distance dA on an optical axis thereof so that the following conditional expressions are satisfied:

$$0.5 < f3/f < 2.5$$

$$-1.5 < f5/f < -0.5$$

$$0.5 < dA/f < 1.0$$

where f is a focal length of a whole lens system.
11. The imaging lens according to claim 10, wherein said second lens has negative refractive power.

12. The imaging lens according to claim 10, wherein said first lens has a focal length f1 so that the following conditional expression is satisfied:

$$-3.5 < f1/f < -1.5.$$

13. The imaging lens according to claim 10, wherein said first lens has a focal length f1 and said second lens has a focal length f2 so that the following conditional expression is satisfied:

$$1.0 < f1/f2 < 1.5.$$

14. An imaging lens comprising:
a first lens having negative refractive power;
a second lens;
a third lens;
a fourth lens; and
a fifth lens, arranged in this order from an object side to an image plane side,
wherein said second lens has a surface on the object side formed into an aspheric shape,
said first lens, said second lens, said third lens, and said fourth lens are formed of a material having an Abbe's number between 45 and 75,
said fifth lens is formed of a material having an Abbe's number between 20 and 40,
said third lens has a focal length f3 so that the following conditional expression is satisfied:

$$0.5 < f3/f < 2.5$$

where f is a focal length of a whole lens system.

15. The imaging lens according to claim 14, wherein said fifth lens has a focal length f5 so that the following conditional expression is satisfied:

$$-1.5 < f5/f < -0.5.$$

16. The imaging lens according to claim 14, wherein said first lens has a focal length f1 so that the following conditional expression is satisfied:

$$-3.5 < f1/f < -1.5.$$

17. The imaging lens according to claim 14, wherein said first lens has a focal length f1 and said second lens has a focal length f2 so that the following conditional expression is satisfied:

$$1.0 < f1/f2 < 1.5.$$

18. The imaging lens according to claim 14, wherein said second lens is situated away from the third lens by a distance dA on an optical axis thereof so that the following conditional expression is satisfied:

$$0.5 < dA/f < 1.0.$$

* * * * *